United States Patent
Benkler et al.

(10) Patent No.: US 9,416,661 B2
(45) Date of Patent: Aug. 16, 2016

(54) AXIAL COMPRESSOR AND ASSOCIATED OPERATING METHOD

(75) Inventors: Francois Benkler, Ratingen (DE); Sascha Dungs, Wesel (DE); Harald Hoell, Wächtersbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 688 days.

(21) Appl. No.: 13/287,308

(22) Filed: Nov. 2, 2011

(65) Prior Publication Data
US 2012/0114459 A1 May 10, 2012

(30) Foreign Application Priority Data

Nov. 4, 2010 (EP) .................................. 10189974

(51) Int. Cl.
*F04D 29/58* (2006.01)
*F01D 5/08* (2006.01)
*F01D 5/18* (2006.01)
*F01D 9/04* (2006.01)
*F01D 9/06* (2006.01)
*F02C 7/141* (2006.01)
*F02C 7/16* (2006.01)
(Continued)

(52) U.S. Cl.
CPC ............... *F01D 5/081* (2013.01); *F01D 5/088* (2013.01); *F01D 5/181* (2013.01); *F01D 5/185* (2013.01); *F01D 5/186* (2013.01); *F01D 5/187* (2013.01); *F01D 9/041* (2013.01); *F01D 9/065* (2013.01); *F02C 7/141* (2013.01); *F02C 7/16* (2013.01); *F02C 7/185* (2013.01); *F04D 29/053* (2013.01); *F04D 29/542* (2013.01); *F04D 29/584* (2013.01); *F05D 2240/20* (2013.01); *F05D 2260/20* (2013.01); *F05D 2260/201* (2013.01); *F05D 2260/202* (2013.01); *F05D 2260/208* (2013.01)

(58) Field of Classification Search
USPC .................................. 415/175, 176, 177, 178
See application file for complete search history.

(56) References Cited

U.S. PATENT DOCUMENTS 6,099,244 A * 8/2000 Tomita et al. ................. 415/115
6,250,878 B1 * 6/2001 Wesling et al. ............... 415/115
(Continued)

FOREIGN PATENT DOCUMENTS

CN      1295184 A    5/2001
DE      3606597 C1   2/1987
(Continued)

*Primary Examiner* — Dwayne J White
*Assistant Examiner* — Jason Fountain

(57) ABSTRACT

An axial compressor for compressing a flow medium is provided and includes compressor stator blades, which fastened on a stator blade carrier, and compressor rotor blades, which are fastened on a compressor disk of a compressor shaft, wherein two consecutive compressor disks enclose a hollow space lying between them, and wherein the last compressor disk, as seen in the flow direction of the flow medium, delimits a rear hollow space. A cooling medium feed duct leads through a stator blade carrier and a compressor stator blade, and is arranged upstream of the last compressor disk, which cooling medium feed duct, at the tip end of the compressor stator blade facing the compressor shaft, via a discharge opening arranged there, opens into the hollow space, wherein this hollow space, via a cooling medium transfer passage which is led through the subsequent compressor disks, is connected to the rear hollow space.

13 Claims, 3 Drawing Sheets

(51) Int. Cl.
*F02C 7/18* (2006.01)
*F04D 29/053* (2006.01)
*F04D 29/54* (2006.01)

(56) References Cited

U.S. PATENT DOCUMENTS

| | | | |
|---|---|---|---|
| 6,986,638 B2 * | 1/2006 | Austin et al. | 415/115 |
| 7,246,989 B2 * | 7/2007 | Glasspoole et al. | 415/1 |
| 8,240,975 B1 * | 8/2012 | Ryznic | 415/1 |
| 2004/0148943 A1 | 8/2004 | Laurello | |
| 2009/0324388 A1 | 12/2009 | Hashimoto | |

FOREIGN PATENT DOCUMENTS

| | | | | |
|---|---|---|---|---|
| EP | 0735255 A1 | | 10/1996 | |
| EP | 1074694 A2 | | 2/2001 | |
| EP | 1640587 A1 | | 3/2006 | |
| JP | 11125199 A | * | 5/1999 | F04D 29/58 |
| JP | H11125199 A | | 5/1999 | |
| JP | 11315800 A | * | 11/1999 | F04D 29/58 |
| JP | H11315800 A | | 11/1999 | |

* cited by examiner

AXIAL COMPRESSOR AND ASSOCIATED OPERATING METHOD

CROSS REFERENCE TO RELATED APPLICATIONS

This application claims priority of European Patent Office application No. 10189974.8 EP filed Nov. 4, 2010, which is incorporated by reference herein in its entirety.

FIELD OF INVENTION

The invention refers to an axial compressor, especially for a gas turbine, for compressing a flow medium, having a multiplicity of compressor stator blades, which are assembled to form stator blade rows and fastened in each case on a stator blade carrier, and having a multiplicity of compressor rotor blades, which are assembled to form rotor blade rows and fastened in each case on a compressor disk of a compressor shaft, wherein two consecutive compressor disks in each case enclose a hollow space lying between them, and wherein the last compressor disk, as seen in the flow direction of the flow medium, delimits a rear hollow space. The invention furthermore refers to a method for operating such an axial compressor.

BACKGROUND OF INVENTION

Gas turbines are used in many fields for driving generators or driven machines. In this case, the energy content of a fuel is utilized for producing a rotational movement of a turbine shaft. To this end, the fuel is combusted in a combustion chamber, wherein compressed air is supplied from an air compressor. The air compressor in this case is customarily constructed as an axial compressor. The operating medium, under high pressure and at high temperature, which is produced in the combustion chamber as a result of the combustion of the fuel, is directed in this case through a turbine unit—which is connected downstream to the combustion chamber—where it expands, performing work. The air compressor, or compressor for short, and the turbine unit are customarily arranged on a common shaft so that the turbine unit drives the compressor during operation.

The combustion chamber of the gas turbine can be constructed as a so-called annular combustion chamber, in which a large number of burners, which are circumferentially arranged around the turbine shaft, open into a common combustion space which is enclosed by a high temperature-resistant surrounding wall. To this end, the combustion chamber is designed as an annular structure in its entirety. In addition to a single combustion chamber, a multiplicity of combustion chambers can also be provided.

For producing the rotational movement of the turbine shaft, in this case a number of turbine rotor blades, which are customarily assembled into blade groups or blade rows, are arranged on this shaft. In this case, a turbine disk, on which the turbine rotor blades are fastened by means of their blade root, is customarily provided for each turbine stage. For flow guiding of the operating medium in the turbine unit, moreover, turbine stator blades, which are connected to the turbine casing and assembled to form stator blade rows, are customarily arranged between adjacent rotor blade rows.

The air compressor of such a gas turbine, in respect to construction, is customarily constructed similarly to the turbine unit and, in a configuration as an axial compressor, comprises a multiplicity of compressor stator blades, which are assembled to form stator blade rows and fastened in each case on a stator blade carrier, and a multiplicity of compressor rotor blades, which are assembled to form rotor blade rows and fastened in each case on a compressor shaft. A rotor blade row and a stator blade row which directly follows it, as seen in the flow direction of the flow medium (in this case air), in this case form a compressor stage. As a rule, a plurality of compressor stages are provided.

The entirety of all the rotating parts of the gas turbine—especially the shaft and the rotor blades—are also referred to as a rotor, and the stationary parts—especially the casing and the stator blades—are also referred to collectively as a stator.

The compressor shaft is customarily assembled from a multiplicity of compressor disks which are arranged one behind the other, as seen in the axial direction, and are held together by means of a tie bolt, for example. In the direction towards the turbine unit, the compressor shaft continues, via a shaft intermediate piece, as the turbine shaft. On its periphery, each of the compressor disks customarily carries the compressor rotor blades of a rotor blade row, which rotor blades, by means of blade roots, for example, are fastened in corresponding fastening grooves of the compressor disk. A compressor disk can also carry a plurality of rotor blade rows.

Annular hollow spaces, also referred to as a cavity in each case in the following text, are customarily provided between two consecutive compressor disks in each case, as a result of which the total weight of the compressor shaft is reduced in comparison to a completely solid type of construction. The last compressor disk, as seen in the flow direction of the flow medium, in a conventional type of construction has a top face or end face which points towards the subsequent turbine unit and together with other components, for example, delimits or at least partially encloses a rear hollow space—also referred to as a rear cavity—which is separated from the flow passage for the flow medium. Such a design is known from EP 1 640 587 B1, for example (compare FIG. 2 there). A plurality of groups of hollow spaces can also be provided in the compressor shaft, wherein, for example, the hollow spaces of a first group lie further on the outside, as seen in the radial direction, whereas the hollow spaces of a second, and, if applicable, of further groups, lie further on the inside.

In the design of such gas turbines, in addition to the achievable power, a particularly high level of efficiency is customarily a design aim. An increase of the efficiency can be achieved in this case, for thermodynamic reasons, basically by an increase of the exit temperature at which working medium discharges from the combustion chamber and flows into the turbine unit. In this case, comparatively high temperatures of the operating medium of 1200° C. and more, for example, are aimed at and also achieved for such gas turbines.

So that such high temperatures or correspondingly high levels of efficiency can be achieved, the air in the compressor should be compressed as intensely as possible. Contingent upon the pressure in the compressor which increases more and more along the flow direction of the gas, the temperature at the compressor exit also increases along with it. The maximum permissible operating temperature of the material of the rear compressor disks is possibly reached in the process.

At present, the maximum permissible operating temperature for available materials represents a limiting boundary condition for the development of gas turbines with regard to the compressor exit temperature. If there is the risk of this limit being exceeded, for example in the case of high ambient temperature, the operating mode of the machine must be throttled. As a result, the potential of the gas turbine cannot be fully utilized.

At the premises of the applicant, technical solutions have been developed, by means of which the last compressor disk, as seen in the flow direction of the flow medium, especially in its top region or end region, is cooled by means of impingement with cooling air. For this, use is made of a cooling-air cooler, for example, which serves essentially for the supply of the front turbine blading with cooled-down cooling air. This cooling air is fed into the rotor through the so-called shaft cover, specifically a shaft cover or casing arranged downstream of the air compressor, as seen in the flow direction of the flow medium. From there, the cooling air then finds its way into the turbine blading. Some of this cooling air is directed from the shaft cover into the cavity downstream of the last compressor disk for cooling the top region of the last compressor disk in the process.

With this form of cooling air feed, it is disadvantageous that the cooling air for the cavity travels a relatively long way through various components of the gas turbine, specifically first through the feed line to the shaft cover and then through the shaft cover itself, which are exposed to circumflow by hot compressor air. As a result, the temperature of the cooling air significantly increases before it reaches the cavity, as a result of which the cooling potential for the last compressor disk is greatly reduced. Furthermore, the last compressor disk is cooled only from one side, and the compressor disks which lie further upstream of it, as seen in the flow direction of the flow medium,—which admittedly are not quite as high as the last compressor disk but are certainly appreciably thermally loaded—are possibly not cooled at all.

SUMMARY OF INVENTION

The invention is therefore based on the object of further developing an axial compressor of the type referred to in the introduction in such a way that with means which are kept simple an effective cooling of the rear compressor disks, especially of the last compressor disk, as seen in the flow direction of the flow medium, is achieved. Furthermore, a corresponding operating method is to be disclosed.

With regard to the axial compressor, this object is achieved according to the invention by at least one cooling medium feed duct which leads through a stator blade carrier and through a compressor stator blade which is fastened on the stator blade carrier and arranged upstream of the last compressor disk, as seen in the flow direction of the flow medium, which cooling medium feed duct, at the tip end of the compressor stator blade facing the compressor shaft, via a discharge opening arranged there, opens into one of the hollow spaces lying between the compressor disks, wherein this hollow space, via at least one cooling medium transfer passage which is led through the subsequent compressor disks, is connected to the rear hollow space.

The invention in this case is based on the consideration that particularly efficient cooling of the rear compressor disks, especially of the last compressor disk, as seen in the flow direction of the flow medium, can be achieved by it being impinged upon by cooling medium of comparatively low temperature on at least one of its two top faces or end faces, preferably on both top faces or end faces. In this case, excessive heating of the cooling medium, which is introduced into the adjacent hollow space, on its way into the hollow space should be avoided.

To this end, according to the invention the cooling medium is fed to a hollow space which adjoins or is adjacent to the compressor disks which are to be cooled via at least one of the compressor stator blades of the stator blade row which lies directly opposite the hollow space in the radial direction. Since this stator blade row and the hollow space which is to be cooled are located essentially at the same position, as seen in the axial direction, the feed of cooling medium is carried out essentially in the radial direction from the outside inwards so that comparatively long transporting or feed paths in the axial direction through various hot components of the gas turbine, in which an undesirable heating of the cooling medium could take place, are avoided.

The introduction of the cooling medium is therefore first carried out via the compressor stator blades into one of the front hollow spaces which lie between two compressor disks, for example into the hollow space which lies upstream of the last compressor disk, as seen in the flow direction of the flow medium, and therefore usually upstream of the last rotor blade row. From this hollow space, the cooling medium, via at least one cooling medium transfer passage, which is subsequently also referred to as transfer passage for short and is led through the subsequent compressor disk(s), is then directed into the rear hollow space downstream of the last compressor disk so that this region is also cooled with the components adjacent to it. The last compressor disk is therefore cooled on both sides, i.e. on both top faces or end faces. From the rear hollow space, the "used" cooling medium can finally discharge as a result of gap leakage, or in some other way, into the flow passage for the flow medium which is to be compressed and/or into downstream cooling medium discharge passages or the like.

The respective transfer passage can be advantageously introduced into the last compressor disk in the style of an axial bore for this purpose. In case the cooling medium is introduced via the compressor stator blades into a hollow space which is located further forward in the compressor shaft and is then directed into the rear hollow space via a number of hollow spaces which are connected in between in respect to flow, corresponding transfer passages through all the compressor disks lying in between are to be expediently provided.

Cooling air, which for example is extracted as partial flow from the compressor air flow further upstream in a colder region of the compressor, is expediently used as cooling medium. Alternatively or additionally, recooling of the cooling air by means of external cooling-air coolers or the like can also be provided.

For realizing the inventive principle, it is sufficient if only a single one of the compressor stator blades of the corresponding stator blade row is provided with a cooling medium feed duct of said type. For an especially efficient and uniform cooling of the rear compressor disks, however, preferably a plurality of, or preferably all, the compressor stator blades—as seen in the circumferential direction—of the stator blade row which is provided for introduction of cooling medium, are equipped with corresponding cooling medium feed ducts.

For the same reason, a plurality of transfer passages, which are especially connected in parallel on the cooling medium side, are expediently provided for each of the compressor disks in question, as seen in the circumferential direction. The respective transfer passage in this case can be led through the corresponding compressor disk especially in the style of an axial bore.

In the case of the aforesaid development, it is expedient if provision is made in the stator blade carrier or in an encompassing casing component for an annular cooling medium distribution chamber, to which are connected the sections of the cooling medium ducts which are arranged in the compressor stator blades.

In a further advantageous development, the compressor stator blades of the stator blade row which are provided for feed of cooling medium are connected at their tip end to a common annular body which on one side, by its outside face, delimits a flow passage for the flow medium which is comparatively hot at this point, and which on the other side, by its inside face, delimits the hollow space which is to be cooled and into which the introduction of cooling medium is carried out. The annular body, which is constructed in the style of a shroud, therefore seals the hollow space in relation to the flow passage and thermally isolates both space regions from each other.

In this case, the respective cooling medium feed duct is expediently led through the annular body so that the cooling medium discharge opening is located on its inside face which faces the hollow space.

In a further expedient development, the rear hollow space, on the side lying opposite the rear end face of the last compressor disk, can be delimited by an end face of, for example, an annular or hollow cylindrical rotor cover (shaft cover). The end face of the rotor cover in this case is also cooled by means of the cooling medium which transfers into the rear hollow space via the transfer passage during operation.

The use of the described axial compressor as an air compressor in a gas turbine is especially preferred, wherein the air compressor and the turbine unit of the gas turbine are advantageously arranged along a common shaft. However, it is also naturally conceivable to operate the axial compressor as a stand-alone unit for other application purposes in which a flow medium is to be compressed. Said advantages of the improved cooling of the compressor exit region come into effect in this case also.

In respect to the method, the object which is refereed to in the introduction is achieved by a cooling medium being introduced into one of the hollow spaces lying between the compressor disks by means of at least one cooling medium feed duct which is led through a stator blade carrier and through a compressor stator blade which is fastened on the stator blade carrier and arranged upstream of the last compressor disk, as seen in the flow direction of the flow medium, wherein from there the cooling medium is introduced into the rear hollow space via at least one cooling medium transfer passage which is led through the subsequent compressor disks.

The advantages which are associated with the invention are especially that in an axial compressor, by means of a feed of cooling medium which is carried out essentially in the radial direction via a spatially adjacent stator blade row, effective cooling of the thermally especially loaded rear compressor disks and of the adjacent components is made possible. A lower thermal loading of the rear compressor disks or a possible increase of the compressor exit pressure with an unchanged loading of the compressor disks results from this.

BRIEF DESCRIPTION OF THE DRAWINGS

An exemplary embodiment of the invention is explained in more detail with reference to a drawing. In the drawings.

Like parts are provided with the same designations in all the figures.

DETAILED DESCRIPTION OF INVENTION

Figure 1:
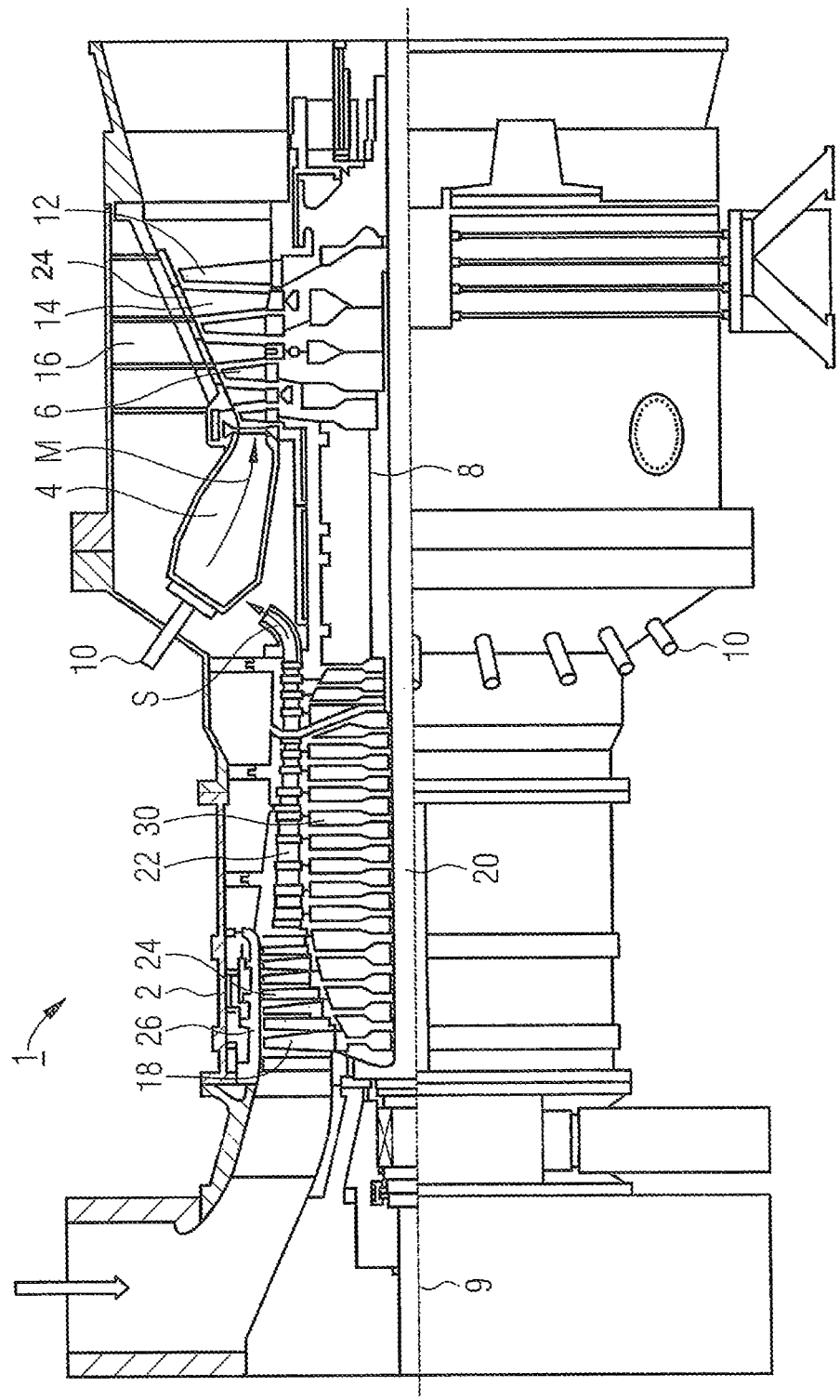
FIG. 1 shows a half-section through a gas turbine.

The gas turbine 1 according to FIG. 1 has a compressor 2 for combustion air, a combustion chamber 4 and also a turbine unit 6 for driving the compressor 2 and for driving a generator or a driven machine, which is not shown. To this end, the turbine unit 6 and the compressor 2 are arranged on a common turbine shaft 8, which is also referred to as a turbine rotor, to which the generator or the driven machine is also connected, and which is rotatably mounted around its center axis 9. The combustion chamber 4, which is constructed in the style of an annular combustion chamber, is equipped with a number of burners 10 for combusting a liquid fuel or gaseous fuel.

The turbine unit 6 has a number of rotatable turbine rotor blades 12 which are connected to the turbine shaft 8. The turbine rotor blades 12 are arranged on the turbine shaft 8 in a ring-like manner and therefore form a number of rotor blade rows. Furthermore, the turbine unit 6 comprises a number of stationary turbine stator blades 14 which are also fastened in a ring-like manner on a stator blade carrier 16 of the turbine unit 6, forming stator blade rows. The turbine rotor blades 12 in this case serve for driving the turbine shaft 8 as a result of impulse transfer from the operating medium M which flows through the turbine unit 6. The turbine stator blades 14, on the other hand, serve for flow guiding of the operating medium M between two consecutive rotor blade rows or rotor blade rings in each case, as seen in the flow direction of the operating medium M. A consecutive pair, consisting of a ring of turbine stator blades 14, or a stator blade row, and of a ring of turbine rotor blades 12, or a rotor blade row, in this case is also referred to as a turbine stage.

The compressor 2 of the gas turbine 1 is constructed similarly to the turbine unit 6. It comprises a multiplicity of compressor rotor blades 18, which are assembled to four' rotor blade rows and by their blade roots are fastened on the turbine shaft 8, referred to as the compressor shaft 20 in this section of the gas turbine 1, which compressor rotor blades project into a flow passage 22 for the inducted flow medium S, in this case air. The compressor rotor blades 18, which are set in rotation via the compressor shaft 20, perform compression work on the flow medium S and transport it in the direction towards the turbine unit 8. The stationary compressor stator blades 24 which are assembled to faun stator blade rows, on the other hand, serve for flow guiding of the flow medium S between two consecutive rotor blade rows in each case, as seen in the flow direction of the flow medium. The compressor stator blades 24 are fastened on associated stator blade carriers 26 which in their turn are connected, in a way not shown, to the outer compressor casing and which—possibly together with further ring segments—form the outer boundary of the flow passage 22. The stator blade carriers 26 can be assembled from a plurality of segments. A consecutive pair consisting of a ring of compressor rotor blades 18, or a rotor blade row, and of a ring of compressor stator blades 24, or a stator blade row, is also referred to as a compressor stage in this case.

Figure 2:
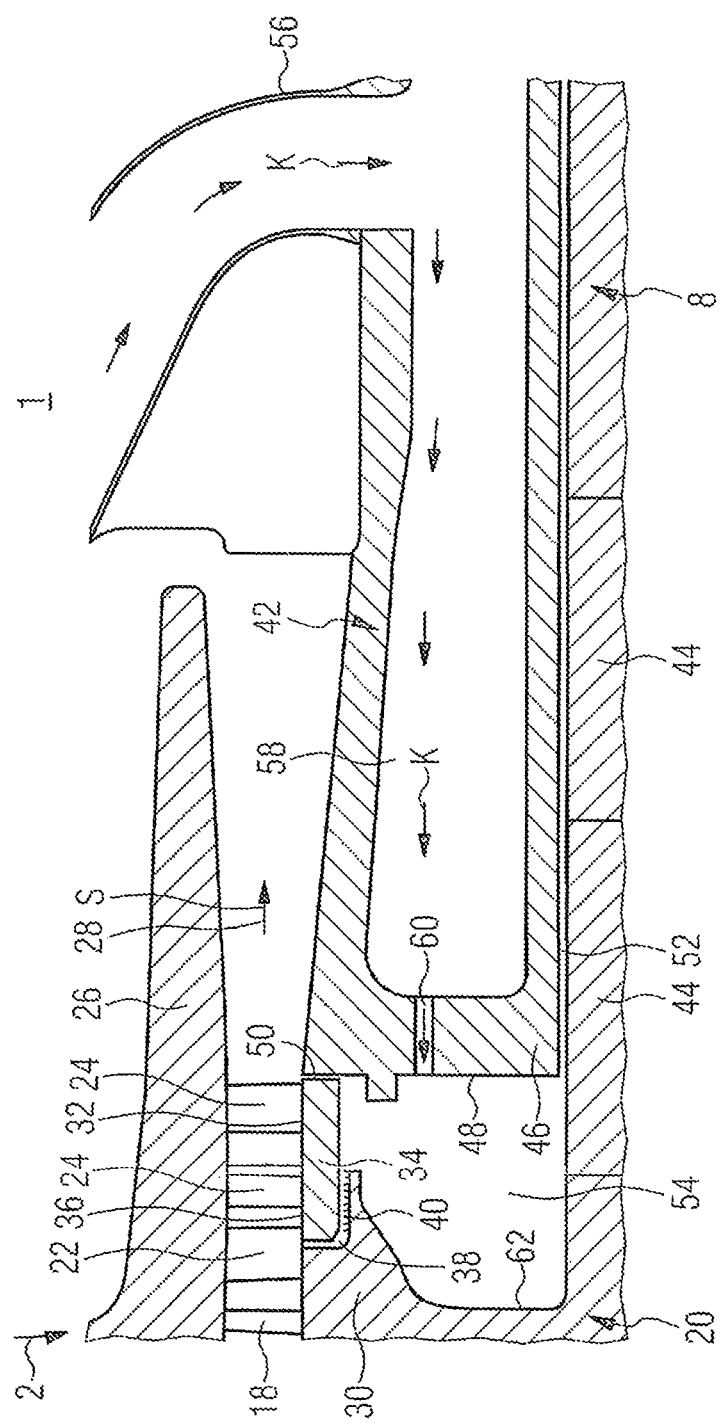
FIG. 2 shows an enlarged detail of the compressor of the gas turbine according to FIG. 1 with a previously provided cooling device for cooling the last compressor disk.

FIG. 2 shows in an enlarged view the exit region or discharge region of the compressor 2 and the subsequent transition region, in the flow direction 28 of the flow medium S, to the combustion chamber 4 and to the turbine unit 6.

The compressor shaft 20 is assembled from a plurality of compressor disks 30, which are arranged one behind the other in a stacked manner, of which only a single compressor disk 30, specifically the rear or last compressor disk 30, as seen in the flow direction 28 of the flow medium S, is visible in FIG. 2. The respective compressor disk 30 carries the compressor rotor blades 18 of the associated rotor blade row on its periphery. The circumferential surface of the respective compressor disk 30, in the region of its extent, at the same time forms the inner boundary of the flow passage 22. In the intermediate regions, in which the compressor stator blades 24 are arranged, the inner boundary of the flow passage 22, on the other hand, is formed in each case by the outer side 32 of an annular body 34 which is connected to the tip ends 36 of the compressor stator blades 24 of the associated stator blade row. The annular gap 38, which is located between the respective—spatially fixed—annular body 34 and the axially adjacent—rotating—compressor disk 30, can be sealed in a conventional manner, by means of a labyrinth seal 40, for example.

In the case of the development according to FIG. 2, the last compressor stage downstream of the last rotor blade row comprises two directly consecutive stator blade rows (so-called double row arrangement), with which is associated a common annular body 34. It does not depend upon this detail, however, in the present case.

In the direction towards the combustion chamber 4, the flow passage 22 widens for the flow medium S, which is compressed in the compressor 2, in the style of a diffuser. The inner boundary of the flow passage 22 is formed in this region by means of the circumferential surface of an annular, so-called shaft cover 42. The stationary shaft cover 42 encloses the rotating turbine shaft 8 which, as an extension of the compressor shaft 20, extends towards the turbine unit 6, and can be assembled from individual shaft segments 44 or disks. The shaft cover 42 extends in the axial direction towards the compressor 2 almost as far as the annular body 34 of the last (double) stator blade row. On the end face which is oriented towards the compressor 2, the shaft cover 42 has an annular flange 46 with an end face 48 which is at a distance from the annular body 34 by means of an axial annular gap 50. The annular flange 46 is at a distance towards the turbine shaft 8 by means of a further, in this case radial, annular gap 52. The annular gap 50, like the annular gap 38, can be provided with suitable sealing means in order to prevent a transfer of the comparatively hot flow medium S from the flow passage 22 at the compressor outlet into the hollow space 54, also referred to as a cavity, which is delimited or enclosed by the last compressor disk 30, the annular body 34, the annular flange 46 and the corresponding section of the turbine shaft 8.

Despite these sealing measures, the components which are adjacent to the hollow space 54, especially the last compressor disk 30, can be exposed to a considerable thermal load during operation of the gas turbine 1 or of the compressor 2. For reducing this load, provision is made in the gas turbine 1 according to FIG. 2 for an introduction of a cooling medium K, in this case cooling air, into the hollow space 54. The cooling medium K in this case is directed, via a cooling medium feed line 56, into a cooling medium duct 58 of, for example, cylindrical contour, which is integrated into the shaft cover 42. From there, the cooling medium flows through one or more transfer passages 60, which are introduced into the annular flange 46, into the hollow space 54 so that the desired cooling of the last compressor disk 30 is realized in the manner of an impingement cooling on the end face 62. The discharge of the "used" cooling medium K is carried out by means of gap leakage, for example, at the annular gaps 38, 50 and 52.

In the case of this cooling concept, it can be disadvantageous, however, that the cooling medium on its path through the cooling medium feed line 56—which for space reasons is led past the combustion chamber 4—and through the cooling medium duct 58 inside the casing of the shaft cover 42—in counterflow to the flow medium S which flows past the shaft cover 42 on the outside and is comparatively highly heated by the compressor 2—is intensely heated and in part loses its cooling potential in the process.

Figure 3:
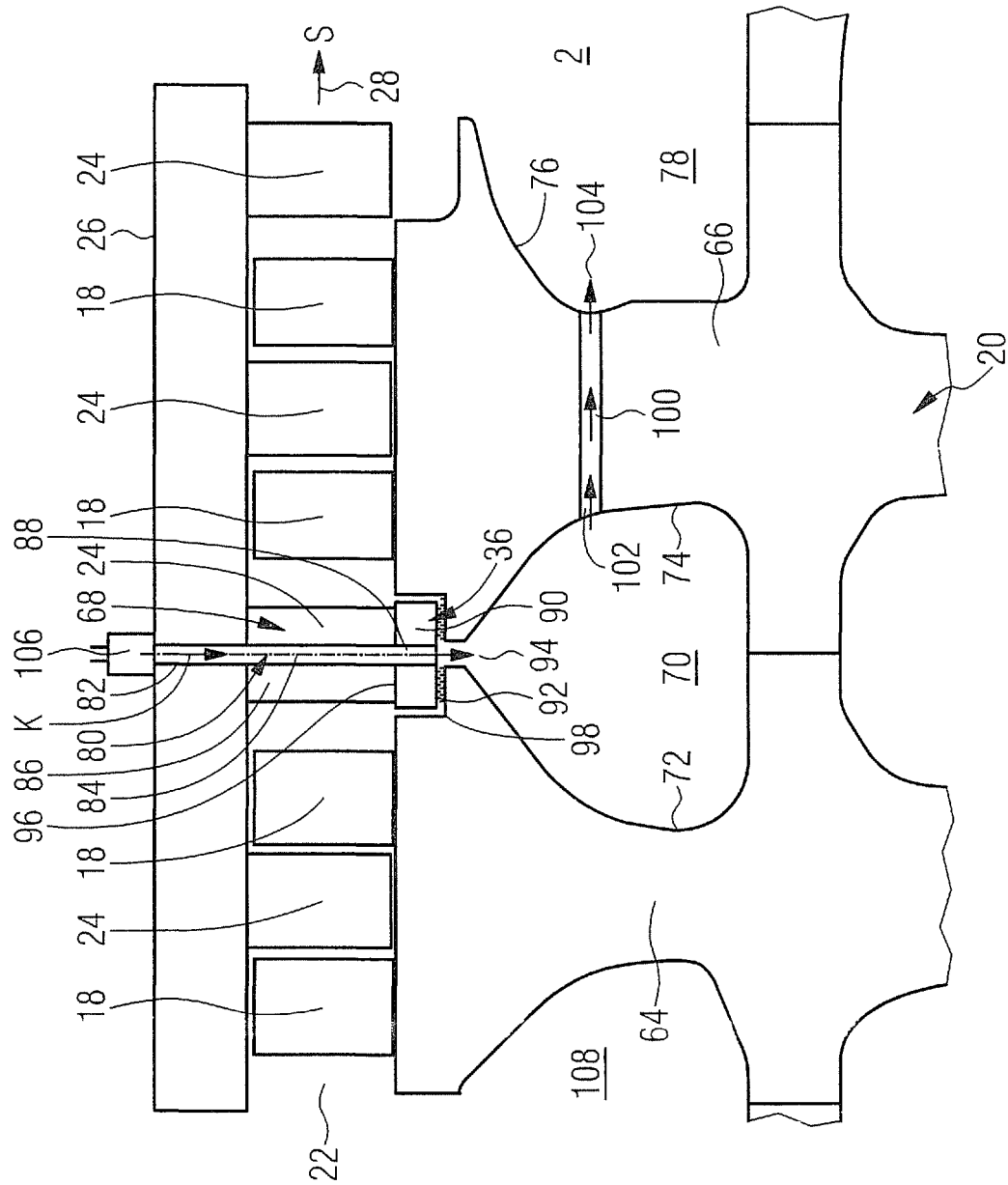
FIG. 3 shows a detail from FIG. 1 with an improved cooling device, compared with FIG. 2, for cooling the rear compressor disks.

For avoiding this problem, an alternative cooling concept is provided in the case of the gas turbine 1 according to FIG. 3.

The construction of the compressor 2 and of the turbine unit 6 basically corresponds to that from FIG. 2 so that at this point only the differences are dealt with.

In the case of the variant according to FIG. 3, each of the two rear compressor disks 64 and 66 carries two stator blade rows, which in this case, however, is not of vital importance. A stator blade row is located between two rotor blade rows in each case and downstream of the last rotor blade row, as seen in the flow direction of the flow medium S. In particular, a stator blade row, specifically the cooling medium feed-stator blade row 68 which is to be described in more detail further down, is located in the axial region between the last but one compressor disk 64 and the last compressor disk 66. Between the last but one compressor disk 64 and the last compressor disk 66 there is an annular hollow space 70 which is delimited by the rear end face 72 of the last but one compressor disk 64 and by the front end face 74 of the last compressor disk 66. The rear end face 76 of the last compressor disk 66 delimits, at least partially, an annular rear hollow space 78. The hollow spaces 70 and 78 are located approximately at the same position, as seen in the radial direction.

For cooling the hollow space 70, a feed of cooling medium K is carried out via a number of compressor stator blades 24 of the cooling medium feed-stator blade row 68. To this end, provision is made for at least one cooling medium feed duct 80 which in a first section 82 is led through the corresponding stator blade carrier 26 to the compressor stator blade 24 in question, and in a second section 84 is continued essentially in the radial direction in the interior of its blade airfoil 86. At the tip end 36 of the compressor stator blade 24, the cooling medium feed duct 80, in an also radially extending end section 88, continues inside the annular body 90, which is connected to the compressor blade 24, and terminates in a discharge opening 94 on the inner side 92 of the annular body 90 facing the hollow space 70. Like in the case of the previously described variant according to FIG. 2, the annular body 90 seals the hollow space 70 in relation to the flow passage 22, wherein the outer side 96 of the annular body 90 in the region of its extent forms the inner boundary of the flow passage 22. Suitable shaft seals, for example in the form of a labyrinth seal, can be arranged in the annular gap 98 which is formed between the annular body 90 and the adjacent compressor disks 64 and 66.

As a result of the comparatively short and direct inflow path, the cooling medium K which is fed to the hollow space 70 is only slightly heated and can therefore develop a comparatively high cooling potential, especially when cooling the rear end face 72 of the last but one compressor disk 64 and the front end face 74 of the last compressor disk 66.

From the hollow space 70, the slightly heated cooling medium K, via one or more cooling medium transfer passages 100 which are preferably arranged in a circumferentially distributed manner, is then directed into the rear hollow space 78 downstream of the last compressor disk 66. To this end, the respective cooling medium transfer passage 100 is introduced into the last compressor disk 66 in the style of an axial bore. The respective axial bore connects the inlet opening 102 of the transfer passage 100, which is arranged in the front end face 74 of the last compressor disk 66, to the discharge opening 104 which is arranged in the rear end face 76. When being discharged into the rear hollow space 78, the cooling medium K is still cold enough to efficiently cool the components—especially the rear end face 76 of the last compressor disk 66—which are adjacent to the rear hollow space 78.

In an especially advantageous variant, a feed of cooling medium, which is approximately uniform in the circumferential direction, into the hollow space 70, which is designed as an annulus, is carried out via a plurality of the compressor stator blades 24 of the corresponding stator blade row 68, wherein, for example, every compressor stator blade 24, every other compressor stator blade or every third compressor stator blade, etc., of this stator blade row 68, as seen in the circumferential direction, can be provided with a corresponding section of a cooling medium feed duct 80 and with a corresponding discharge opening 94 for cooling medium K. These duct sections are therefore connected in parallel on the cooling medium side and are fed simultaneously with fresh cooling medium K via a circumferentially extending cooling medium distribution chamber 106, for example, which is shown only schematically in FIG. 3 and arranged in the stator blade carrier 26 or in an adjacent casing component.

It is understood that some of the details shown in FIG. 3 have characters which are only by way of example. Deviating from the view which is selected here, for example the orientation of the end section 88 of the cooling medium feed duct 80 and the position of the discharge opening 94 can vary. Also, the feed of cooling medium could alternatively or additionally be carried out, via an associated stator blade row lying upstream of the stator blade row 68, into a hollow space which lies upstream of the hollow space 70, for example into the hollow space 108, as seen in the flow direction of the flow medium S. In the case of this variant, the front hollow space 108, which in such a way is exposed to admission of cooling medium K, in its turn, is connected via additional cooling medium transfer passages (not shown in FIG. 3) indirectly— i.e. via hollow spaces lying further to the rear—or directly to the rear hollow space 78.

Furthermore, it is conceivable to combine the two cooling concepts according to FIG. 2 and FIG. 3 with each other.

The invention claimed is:

1. An axial compressor for compressing a flow medium, comprising:
    a plurality of compressor stator blades, which are assembled to form stator blade rows and are fastened in each case on a stator blade carrier;
    a plurality of compressor rotor blades, which are assembled to form rotor blade rows and are fastened in each case on a compressor disk of a compressor shaft; and
    a cooling medium feed duct through which a cooling medium is fed,
    wherein two consecutive compressor disks in each case enclose a hollow space lying between them,
    wherein a last compressor disk, as seen in a flow direction of the flow medium, delimits a rear hollow space,
    wherein the cooling medium feed duct leads through the stator blade carrier and through a compressor stator blade of the plurality of compressor stator blades is fastened on the stator blade carrier and arranged upstream of the last compressor disk, as seen in the flow direction of the flow medium,
    wherein the cooling medium feed duct, at a tip end of the compressor stator blade facing the compressor shaft, via a discharge opening arranged there, opens into the hollow space lying between the compressor disks,
    wherein the hollow space, via a cooling medium transfer passage is led through a subsequent compressor disk, and is connected to the rear hollow space, and
    wherein the rear hollow space, on a side lying opposite a rear end face of the last compressor disk, is delimited by an end face of an annular rotor cover, and
    wherein the cooling medium flows from an inlet opening of the cooling medium transfer passage, the inlet opeing arranged in a front end face of the last compressor disk, to a further discharge opeing arranged in the rear end face,
    wherein from the further discharge opening the cooling medium flows into the rear hollow space.

2. The axial compressor as claimed in claim 1, wherein the plurality of the compressor stator blades of a stator blade row, which is arranged upstream of the last compressor disk, as seen in a circumferential direction, are equipped with corresponding cooling medium feed ducts connected together in parallel via a cooling medium distribution chamber.

3. The axial compressor as claimed in claim 2, wherein provision is made in the stator blade carrier or in an encompassing casing component for an annular cooling medium distribution chamber, to which are connected a plurality of sections of the cooling medium feed ducts which are arranged in the compressor stator blade.

4. The axial compressor as claimed in claim 1, wherein the compressor stator blades of the stator blade row which is provided for the feed of cooling medium are connected at their tip end to an annular body which on one side delimits a flow passage for the flow medium, and on the other side seals the hollow space, in relation to the flow passage.

5. The axial compressor as claimed in claim 4, wherein the respective cooling medium feed duct is led through the annular body.

6. The axial compressor as claimed in claim 1, wherein the respective cooling medium feed duct opens into the hollow space which directly precedes the rear hollow space.

7. The axial compressor as claimed in claim 1, wherein the axial compressor is used on a gas turbine.

8. A gas turbine, comprising:
    the axial compressor as claimed in claim 1; and
    a turbine unit arranged downstream from the axial compressor,
    wherein the axial compressor and the turbine unit are arranged on a common shaft.

9. The gas turbine as claimed in claim 8, wherein the plurality of the compressor stator blades of a stator blade row, which is arranged upstream of the last compressor disk, as seen in a circumferential direction, are equipped with corresponding cooling medium feed ducts.

10. The gas turbine as claimed in claim 9, wherein provision is made in the stator blade carrier or in an encompassing casing component for an annular cooling medium distribution chamber, to which are connected a plurality of sections of the cooling medium feed ducts which are arranged in the compressor stator blade.

11. The gas turbine as claimed in claim 8, wherein the compressor stator blades of the stator blade row which is provided for the feed of cooling medium are connected at their tip end to an annular body which on one side delimits a flow passage for the flow medium, and on the other side seals the hollow space, in relation to the flow passage.

12. The gas turbine as claimed in claim 11, wherein the respective cooling medium feed duct is led through the annular body.

13. The gas turbine as claimed in claim 8, wherein the respective cooling medium feed duct opens into the hollow space which directly precedes the rear hollow space.

* * * * *